(12) United States Patent
Chang

(10) Patent No.: US 6,442,029 B1
(45) Date of Patent: Aug. 27, 2002

(54) CONTROL DEVICE FOR MASTER/SLAVE SIGNAL OF STORING DEVICE IN A COMPUTER MOBILE RACK

(76) Inventor: Cheng-Chun Chang, 11F-2, No. 11, Lane 202, Jing-Shing Road, Wen-Shan DT, Taipei (TW)

(*) Notice: Subject to any disclaimer, the term of this patent is extended or adjusted under 35 U.S.C. 154(b) by 0 days.

(21) Appl. No.: 09/714,158

(22) Filed: Nov. 17, 2000

(30) Foreign Application Priority Data

Oct. 27, 2000 (TW) ......................................... 089218739

(51) Int. Cl.[7] ................................................. H05K 5/30
(52) U.S. Cl. ....................... 361/724; 361/727; 248/917; 439/377
(58) Field of Search .............................. 361/724–727, 361/683–686; 360/73.02; 379/88.26; 248/917; 312/350; 439/928.1, 945, 374, 377; D18/6–8

(56) References Cited

U.S. PATENT DOCUMENTS 5,911,589 A * 6/1999 Chen .......................... 439/296
6,222,726 B1 * 4/2001 Cha ............................ 361/683
6,304,440 B1 * 10/2001 Lin ............................. 361/685

* cited by examiner

Primary Examiner—Darren Schuberg
Assistant Examiner—Hung Van Duong
(74) Attorney, Agent, or Firm—Troxell Law Office PLLC

(57) ABSTRACT

A control device for a master/slave signal of storing device for a computer mobile rack comprises an inner rack and an extended device. The inner rack is a semi-enclosed rack, an inner rack connector is disposed at the rear plate thereof to engage with a fixing connector preset at a containing frame on the computer system unit and with the storing device to constitute a circuit and a signal connections. The extended device has two ends and an end thereof is provided with a joining terminal and the other end thereof is provided with an adjustable terminal. The adjustable terminal is possible to allow at least a jumper being detachably inserted therein. Once the storing device is fixed to the inner rack, the terminal seat at the rear side of the storing device can be inserted by and engage with the joining terminal on the extended device. Therefore, the signal can be extended via the adjustable terminal. The terminal seat is disposed at the rear plate or the front plate of the inner rack and at least a jumper may detachably engage with pins in the adjustable terminal optionally to adjust the master/slave signal of the storing device quickly.

11 Claims, 2 Drawing Sheets

CONTROL DEVICE FOR MASTER/SLAVE SIGNAL OF STORING DEVICE IN A COMPUTER MOBILE RACK

BACKGROUND OF THE INVENTION

1. Field of the Invention

The present invention relates to a control device for master/slave signal of a storing device in a computer mobile rack. In particular, the present invention relates to a control device, which is possible to quickly adjust a master/slave signal of storing device in a mobile rack of computer.

2. Description of Related Art

Due to a rapid development of information technology, the hardware of computer has occurred a revolutionary variation to adapt with a variety of changes. For instance, a hard disk was fixed inside the casing of computer system unit during the earlier period. In order to have the data being reserved or copied and to consider the portability and the security of data, the so-called mobile rack for a hard disk was developed to meet the need and it brings a great convenience to the user. In fact, the periphery device received in the inner rack of the mobile rack may be a zip disk drive, a magneto-optical disk drive, a magnetic tape unit, or a card read instead of the hard disk. Hence, the mobile rack can provide a wider range of usefulness than before.

Taking the typical arrangement of personal computer available on the market as an example, periphery devices thereof usually contain an interface of intelligent drive electronics (IDE). When the user starts the computer, the main board may inspect a master/slave mode connecting with the primary IDE and another master/slave mode connecting with the second IDE by way of two signal banks. A terminal seat is provided on the IDE interface hard disk, the CD-ROM, the CD-R, CD-RW, and storing devices mentioned in the preceding paragraph, respectively. Two jumpers are utilized to make at least a pair of pins in the terminal seat be in a state of open circuit or close circuit. In this way, the master/slave signal of any one of these periphery devices is then regulated to favor the recognition done by the main board.

The following description will take the hard disk as an example. The terminal seat was disposed at the bottom of the hard disk at the earlier period such that the master/slave signal is not possible to extended outward. In order to be possible for adjusting the master/slave signal easily hard disk makers have moved the terminal seat with the power source socket to the rear side of the hard disk in the recent years. This arrangement has become a common standard. The hard disk is received in the inner rack of the mobile rack and the connector at the rear side of the inner rack conceals the terminal seat of the hard disk such that it is hard for the user to adjust the master/slave signal of the hard disk. In order to ease the adjustment of the master/slave signal, some users keep the hard disk movable in the inner rack instead of being fastened by screws. In case of the hard disk having been replaced by another one and the master/slave signal having to be changed, one of jumpers can be plugged in or pulled out quickly to perform the adjustment of the master/slave signal. However, this way may result in damage of the hard disk because of inferior stability under high speed running of the hard disk. A minor damage of the hard disk may be shut down or broken magnetic tracks and a serious damage may result in the entire hard disk becoming useless.

SUMMARY OF THE INVENTION

An object of the present invention is to provide a control device for a master/slave signal of a storing device in a computer mobile rack, which is possible for the master/slave signal being changed fast and easily without taking out the storing device from the mobile rack.

BRIEF DESCRIPTION OF THE DRAWINGS

The present invention can be more fully understood by referring to the following description and accompanying drawings, in which.

DETAILED DESCRIPTION OF THE PREFERRED EMBODIMENTS

Figure 1:
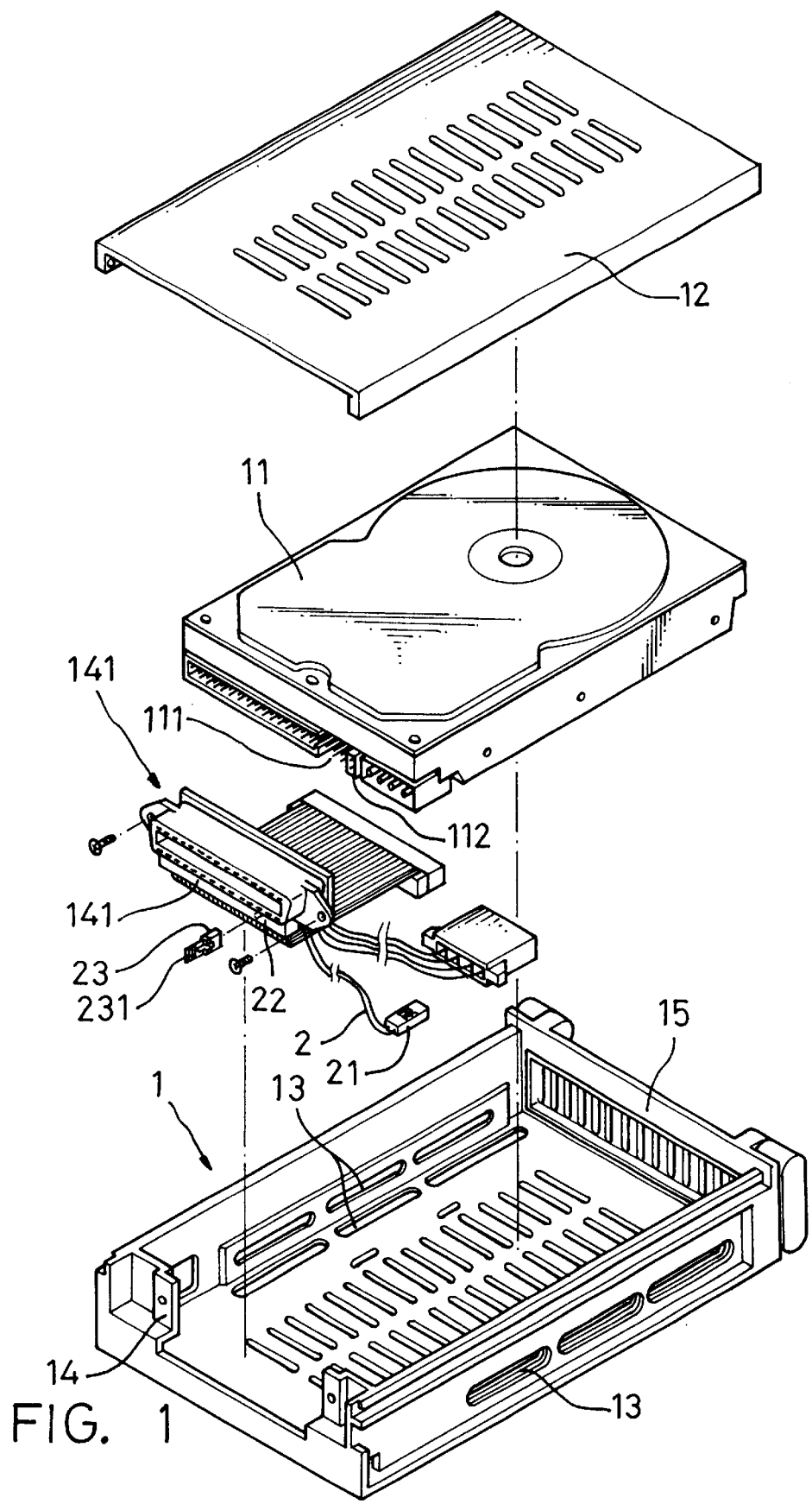
FIG. 1 is a perspective exploded view of the present invention.
Figure 2:
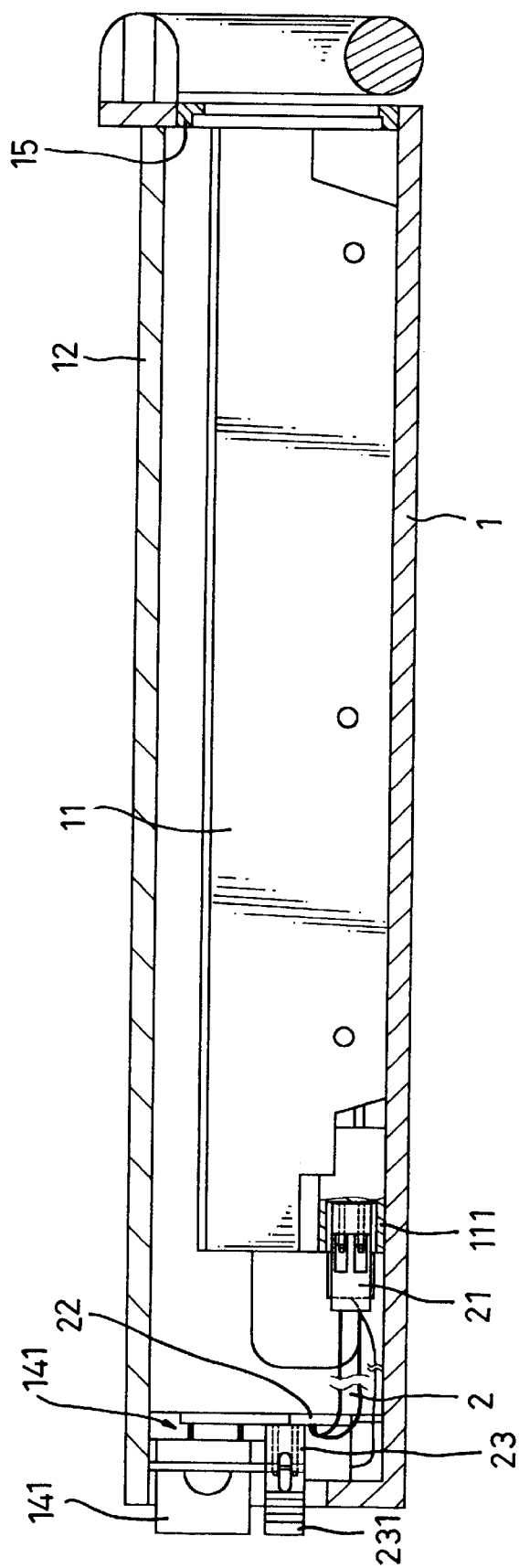
FIG. 2 is a sectional view of the structure device shown in FIG. 1 after assembly.

Referring to FIGS. 1 and 2, the control device for a master/slave signal of a storing device in a computer mobile rack according to the present invention comprises an inner rack 1 of a mobile rack and an extended device 2.

The inner rack 1 is semi-closed rack fixed to a containing frame on the casing of a system unit (It is prior art and not shown in the figures) to constitute a circuit and a signal connections. A storing device 11 is provided in the inner rack 1 and an upper lid 12 is movably attached to the top of the inner rack 1. Thus, the storing device such as the hard disk, the zip disk drive, the magneto-optical disk drive, the magnetic tape unit, or the card read can be enclosed in the inner rack 1. Besides, the inner rack 1 at both lateral sides and the bottom thereof is provided with a plurality of engaging openings 13 such that the storing device 11 can be fastened to the inner rack 1 by way of screws passing through these openings 13. The inner rack 1 at a rear plate 14 thereof is provided with a connector 141 to connect with the storing device and a fixed connector in the containing frame (It is prior and not shown in the figures) respectively. Hence, the storing device 11 may read and write data.

A difference of the present invention from the prior art is that an extending device 2 is provided. An end of the extended device is a joining terminal 21 to engage with a preset terminal seat 111 at rear side of the storing device and the other end is an adjustable terminal 22. Thus, it is possible for the signal of the storing device to extend to the adjustable terminal 22. The adjustable terminal 22 is fixed to the rear plate 14 on the inner rack 1, the inner rack connector 141, or the front plate 15 of the inner rack 1. Once at least a jumper 23 is inserted into the adjustable end 22 and engages with connecting pin therein optionally, the master/slave signal of the storing device is adjusted immediately to adapt with another computer's master/slave mode.

Referring to FIGS. 1 and 2 again, the device illustrated in these figures is a preferred embodiment of the present invention. It can be seen that the terminal seat 111 on the storing device 11 has been inserted a prior art jumper 112 and the joining terminal 21 on the extended device 2 engages with a pair of terminals, which is used for determining the master/slave signal. The adjustable terminal 22 on the extended device 2 connects with a circuit board in the inner rack connector 141 and another two terminals are extended outward. This means the original terminals for determining the master/slave signal of the terminal seat 111 are extended to the location of inner rack connector 141. Thus, if a jumper 23 engages with two pins on the adjustable end 22, it may constitute a state of master mode and if the jumper 23 disengages from these two pins, it may constitute a state of a slave mode. In addition, a hold end 231 may be provided to extend laterally so as to be held by the user handily while the engagement or disengagement for the jumper 23 is operated.

Moreover, the adjustable terminal 22 may be provided to connect a switch with dual stages instead of the jumper 23. The master/slave mode may be determined by way of the switch in on/off.

It is appreciated that advantages offered by the present invention are not possible for the prior to achieved effectively. For instance, the jumper can be inserted into or pulled out from the adjustable end quickly to change the master/slave signal of the storing device without the need of detaching the storing device from the inner rack before the adjustment being performed. Besides, the process of stating the computer may be set either one of four modes in the first and the second sections of master or slave modes by way of basic input/output system in the computer. Then, the IDE interface may be formed a system with multiple starts as the SCSI (Small Computer System Interface) system does to have the user obtain great effectiveness and convenience. Furthermore, the jumper is possible to be replaced by a switch with double stages such that a control of on/off of the switch can decide the master/slave signal of the storing device either.

While the invention has been described with reference to the preferred embodiments thereof, it is to be understood that modifications or variations may be easily made without departing from the spirit of this invention, which is defined by the appended claims.

What is claimed is:

1. A computer rack having a master/slave storing device and a control device for controlling the master/slave function of the storing device and comprising:

a) an inner rack having a rear portion with a rear plate;

b) a storing device mounted in the inner rack, the storing device including a rear terminal;

c) a connector mounted on the inner rack so as to be accessible from exteriorly of the inner rack, the connector connected to the rear terminal of the storing device; and, d) an extending device including a joining terminal connected to the rear terminal of the storing device and an adjustable terminal mounted on the connector so as to be accessible from exteriorly of the inner rack, whereby the adjustable terminal controls the master/slave function of the storing device.

2. The computer rack of claim 1 further comprising a jumper is removably connectable with the adjustable terminal so as to control the master/slave function of the storing device.

3. The computer rack of claim 1 wherein the connector is mounted on the rear portion of the inner rack.

4. The computer rack of claim 1 wherein the adjustable terminal comprises a switch.

5. The computer rack of claim 1 wherein the storing device comprises a hard disk drive.

6. The computer rack of claim 1 wherein the storing device comprises a zip disk drive.

7. The computer rack of claim 1 wherein the storing device comprises a magneto-optical disk drive.

8. The computer rack of claim 1 wherein the storing device comprises a magnetic tape unit.

9. The computer rack of claim 1 wherein the storing device comprises a card reader.

10. The computer rack of claim 1 further comprising an upper lid attached to a top of the inner mask.

11. The computer rack of claim 2 wherein the jumper includes an extending holding end enabling a user to grip the jumper.

* * * * *